United States Patent
Seeley et al.

(10) Patent No.: US 12,270,449 B2
(45) Date of Patent: *Apr. 8, 2025

(54) AUTOMATICALLY TUNABLE MASS DAMPER

(71) Applicant: General Electric Company, Schenectady, NY (US)

(72) Inventors: Charles Erklin Seeley, Niskayuna, NY (US); Eladio Clemente Delgado, Burnt Hills, NY (US)

(73) Assignee: GE Infrastructure Technology LLC, Greenville, SC (US)

( * ) Notice: Subject to any disclaimer, the term of this patent is extended or adjusted under 35 U.S.C. 154(b) by 532 days.

This patent is subject to a terminal disclaimer.

(21) Appl. No.: 17/685,495

(22) Filed: Mar. 3, 2022

(65) Prior Publication Data

US 2023/0279917 A1   Sep. 7, 2023

(51) Int. Cl.
*F16F 7/10*  (2006.01)
*F16F 7/104*  (2006.01)
(Continued)

(52) U.S. Cl.
CPC ......... *F16F 7/1005* (2013.01); *F16F 7/104* (2013.01); *H02K 7/02* (2013.01); *H02K 7/116* (2013.01); *F03D 7/0296* (2013.01); *F05D 2260/96* (2013.01); *F16F 2222/08* (2013.01); *F16F 2232/08* (2013.01)

(58) Field of Classification Search
CPC .......... F16F 7/1022; F16F 7/1005; F16F 1/04; F16F 15/18; F16F 2222/08; H02K 7/02; H02K 7/116; F05D 2260/96; F03D 7/0296

See application file for complete search history.

(56) References Cited

U.S. PATENT DOCUMENTS

| | | | | |
|---|---|---|---|---|
| 1,557,570 A | * | 10/1925 | Eckman | B60K 25/10 180/65.31 |
| 4,032,829 A | * | 6/1977 | Schenavar | B60K 25/10 322/3 |

(Continued)

FOREIGN PATENT DOCUMENTS

| | | |
|---|---|---|
| CN | 108916317 B | 7/2020 |
| CN | 113152709 A | 7/2021 |

(Continued)

OTHER PUBLICATIONS

EP Search Report for EP application No. 23159692.5, Jul. 24, 2023, 7 pages.

*Primary Examiner* — Nicholas J Lane
(74) *Attorney, Agent, or Firm* — Dority & Manning, P.A.

(57) ABSTRACT

A system and method include with a mass damper for reducing vibrations in a structure or machine. The mass damper includes a frame that is movable linearly along a base, which includes a track gear. A flywheel is in geared engagement with the track gear so as to be rotationally driven as the frame moves linearly relative to the base. A rotation damper is mounted on the frame and is geared engagement with the flywheel, the rotation damper producing a counter-torque against rotation of the flywheel that is proportional to a rotational velocity of the flywheel. The rotation damper has an electrical characteristic that is automatically adjusted to change the counter-torque and tune the mass damper.

20 Claims, 5 Drawing Sheets

(51) Int. Cl.
  *H02K 7/02* (2006.01)
  *H02K 7/116* (2006.01)
  *F03D 7/02* (2006.01)

(56) References Cited

U.S. PATENT DOCUMENTS

| | | | |
|---|---|---|---|
| 4,387,781 A * | 6/1983 | Ezell | B60K 25/10 |
| | | | 180/65.265 |
| 7,854,589 B2 | 12/2010 | Nielsen et al. | |
| 8,446,022 B2 * | 5/2013 | Jiang | F03G 7/08 |
| | | | 290/1 R |
| 8,672,107 B2 * | 3/2014 | Ivanco | F16F 9/12 |
| | | | 188/380 |
| 9,316,202 B2 | 4/2016 | Bech | |
| 10,161,389 B2 | 12/2018 | Teichert | |
| 10,619,699 B2 | 4/2020 | Ivanco | |
| 10,718,232 B2 | 7/2020 | Mitsch | |
| 11,572,868 B1 | 2/2023 | Seeley et al. | |
| 2007/0090703 A1 * | 4/2007 | Yeh | H02K 7/1876 |
| | | | 310/83 |
| 2009/0148289 A1 | 6/2009 | Edenfeld | |
| 2011/0220443 A1 | 9/2011 | Ivanco | |
| 2013/0160603 A1 | 6/2013 | Lagiewka et al. | |
| 2019/0001775 A1 * | 1/2019 | Anderson | F16F 15/02 |
| 2020/0284240 A1 | 9/2020 | Mitsch | |
| 2020/0362932 A1 * | 11/2020 | Zhang | F16F 7/1005 |
| 2021/0079896 A1 | 3/2021 | Herrig et al. | |
| 2021/0123415 A1 | 4/2021 | Couturier | |
| 2021/0254605 A1 | 8/2021 | Madsen et al. | |

FOREIGN PATENT DOCUMENTS

| | | |
|---|---|---|
| EP | 3795824 A1 | 3/2021 |
| JP | S62251542 A | 11/1987 |
| WO | WO2008/040347 A1 | 4/2008 |

* cited by examiner

AUTOMATICALLY TUNABLE MASS DAMPER

FIELD

The present disclosure relates in general to a vibration damper, and more particularly to a mass damper that can be automatically tuned.

BACKGROUND

Many types of structures are susceptible to vibrations being induced therein from any number of sources, such as external conditions (e.g., wind) or internal operating conditions in the case of machinery. These vibrations need to be damped to prevent damage to the structure or machine.

In this regard, numerous types of vibration dampers have been developed. Structural vibrations frequently need to be damped to prevent damage to a structure. For example, a linear damper is well-known that essentially includes a piston within a fluid-filled cylinder. A rod connects the piston to the structure such that vibrations induced in the structure are transmitted to the piston, wherein the linear movement of the piston in the cylinder is damped, which results in a damping of the structural vibrations. This type of linear damper, however, requires a significant amount of effective operational space. In addition, tuning this type of damper typically involves removal and disassembly of the damper from the structure in order to change the fluid in the cylinder.

Another type of conventional damper utilizes a mass suspended from an elastomeric material (i.e., a material having a material strain characteristic that exhibits a viscous force). These devices, however, have a range of motion and operation that is restricted by the elastomeric material and cannot be tuned without essentially replacing the elastomeric material.

U.S. Pat. No. 8,672,107 describes a vibration damper that includes a rigid base with a mass coupled thereto for linear movement along the base. A first spring coupled to the mass compresses in response to the linear movement along a first direction and a second spring coupled to the mass compresses in response to the linear movement along a second direction that is opposite to the first direction. A converter coupled to the mass converts the linear movement to a corresponding rotational movement. A fluid-filled rotary damper is coupled to the converter and damps the rotational movement. More specifically, the fluid-filled rotary damper is supported by a housing. An axle is rotatably supported on one end by the housing and is coupled on its other end to a rotor of the rotary damper. A spur gear is attached to axle for rotation therewith and is engaged with a linear rack gear fixedly coupled to the base. Thus, linear motion experienced by the housing due to vibrations in structure causes the spur gear to rotate via its engagement with the rack gear. The corresponding rotation of the axle is transferred to the rotor of rotary damper whereby such rotational motion is dampened.

The damper according to the US '107 patent is tuned via selection of the springs having a desired spring rate and also by adjusting the amount of mass that is subject to linear motion in linear direction. A changeable mass is provided on the housing of the damper for this purpose.

U.S. Pat. No. 10,619,699 describes a compact vibration damper configured to be remotely-tunable or self-tuning. The damper includes a rigid base with a mass coupled to the base for linear movement thereon. A converter is coupled to the mass and converts the linear movement to a corresponding rotational movement, wherein a rotary damper coupled to the converter damps the rotational movement. Rotary springs are coupled to the shaft that spins the rotary damper thereby opposing linear movement of the mass. A flywheel is also coupled to the shaft, wherein rotational motion of the flywheel increases the kinetic energy such that the effectiveness of the mass is much greater than linear motion alone. An electronic linear actuator operates a weight actuator assembly, such as a scissor assembly, pivot arm, jackscrew, etc., that moves the flywheel thereby changing the mass moment of inertia of the spinning flywheel without changing the actual mass of the flywheel. Thus, the linear actuator is used to tune the damper by moving the weight actuator assembly and flywheel to tune the compact vibration damper.

The tuning capability of the US '699 patent thus depends on relatively complex mechanical linkages, actuators, and structures to change the mass inertia of a flywheel by moving masses radially towards and away from the rotational axis of the flywheel.

The present disclosure provides an alternate, effective, and compact remotely-tunable mass damper that is relatively simple in structure and operation as compared, for example, to the tunable mass dampers of the prior art.

BRIEF DESCRIPTION

Aspects and advantages of the invention will be set forth in part in the following description, or may be obvious from the description, or may be learned through practice of the invention.

The present disclosure encompasses embodiments of a mass damper for reducing vibrations in a structure or machine. The mass damper is not limited to any particular type of structure or machine and has usefulness in any situation wherein it is desired to reduce or eliminate vibrations being induced in a structure or machine. Aspects of the mass damper may be described herein with reference to mounting on wind turbine rotor blades for illustrative purposes only.

An embodiment of the mass damper includes a frame mounted on a base, wherein the frame is movable linearly along the base as a result of vibrations or oscillations induced in the structure on which the mass damper is mounted. A track gear is disposed on the base and a flywheel is in geared engagement with the track gear so as to be rotationally driven as the frame moves linearly relative to the base. A rotation damper is mounted on the frame and is in geared engagement with the flywheel. The rotation damper produces a counter-torque against rotation of the flywheel, wherein the counter-torque is proportional to a rotational velocity of the flywheel. The rotation damper has an electrical characteristic that is automatically adjustable or changeable to alter the counter-torque and thereby tune the vibration mass damper.

In a particular embodiment, the rotation damper may include an electrical generator driven by the flywheel, wherein the electrical characteristic is an electrical output of the generator that is directly proportional to the rotational velocity of the flywheel and produces the counter-torque. In this embodiment, an effective electrical load is placed on the generator, wherein the electrical output of the generator is varied by automatically adjusting the effective electrical load responsive to movement of the mass damper to tune the vibration mass damper.

In a particular embodiment, the effective electrical load may be provided by an electronically variable resistor configuration, such as a rheostat or variable resistor array. In an alternate embodiment, the effective electrical load may be provided by a pulse width modulation (PWM) controlled relay, wherein, when actuated, the relay places a resistive load on the generator. The frequency and duration of the "on" cycle of the relay (and thus the resistive load) provides the effective electrical load.

The mass damper may include a local controller configured to automatically adjust the effective electrical load responsive to the movement of the mass damper. This local controller may be in communication with a remote controller for various purposes, for example to change operating parameters of the mass damper.

Certain embodiments of the mass damper may include an adjustable ballast weight mounted to the frame, wherein weight can be added to or taken away from the ballast weight to additionally tune the mass damper.

In a particular structural configuration of the mass damper, the frame and the track gear may be located within a housing mounted to the base, wherein the base and the housing are configured for stationary mounting to the structure or machine.

In one embodiment, the flywheel may include an outer circumferential surface that is geared directly to the track gear. In this embodiment, the rotation damper may be geared directly to the outer circumferential surface of the flywheel. An embodiment may be provided wherein the rotation damper includes s an electrical generator driven by the flywheel.

Embodiments of the mass damper may include an attachment system configured to removably attach the mass damper to the structure or machine. The attachment system may include opposite clamping shells that conform to a shape of the structure or machine on which the mass damper is mounted. The base of the mass damper may be fixed to one of the clamping shells.

The present invention also encompasses embodiments of a method for reducing vibrations in a structure or machine, the method including attaching an electronically tunable mass damper at a fixed location on the structure or machine and sensing vibrations or oscillations induced in the structure or machine. The method includes tuning the mass damper based on the sensed vibrations or oscillations by automatically varying an electrical characteristic of the mass damper responsive to the sensed vibrations or oscillations.

The method may include controlling the tuning process with a local controller configured with the mass damper, wherein operating parameters of the mass damper may be changed by a remote central controller that is in communication with the local controller. Alternatively, the method may include placing the local controller in communication with a mobile smart device for performing any of the functions of the remote controller. This mobile smart device may also be in communication with the remote controller.

In certain embodiments, the mass damper includes a flywheel connected to a rotation damper, wherein the method includes automatically tuning the mass damper by electronically controlling a counter-torque exerted against rotation of the flywheel by the rotation damper. In this embodiment, the rotation damper may include an electrical generator that is in geared engagement with and driven by the flywheel, wherein an electrical output of the generator is directly proportional to the rotational velocity of the flywheel and is controlled to produce a desired degree of counter-torque for the tuning process. For example, the tuning process may include remotely varying an electrical load placed on the generator to change the counter-torque exerted by the generator at a given rotational speed of the flywheel.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As mentioned above, the tunable mass damper of the present invention is intended for use on any structure of machine wherein it is desired to reduce or eliminate vibrations or oscillations induced in the structure or machine by internal or external forces. The tunable mass damper has particular usefulness as a device mountable to the rotor blades of a wind turbine power generating system. Aspects of the mass damper may be described herein with regards to its use on such rotor blades merely as an example and not as a limiting aspect of the invention.

As used herein, the term "controller" refers not only to integrated circuits referred to in the art as being included in a computer, but also refers to a microcontroller, a microcomputer, a programmable logic controller (PLC), an application specific integrated circuit, and other programmable circuits. The controller is also configured to compute advanced control algorithms and communicate to a variety of Ethernet or serial-based protocols (Modbus, OPC, CAN, etc.). Additionally, a memory device(s) configured with the controller may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s) 402, configure the controller to perform the various functions as described herein.

Figure 1:
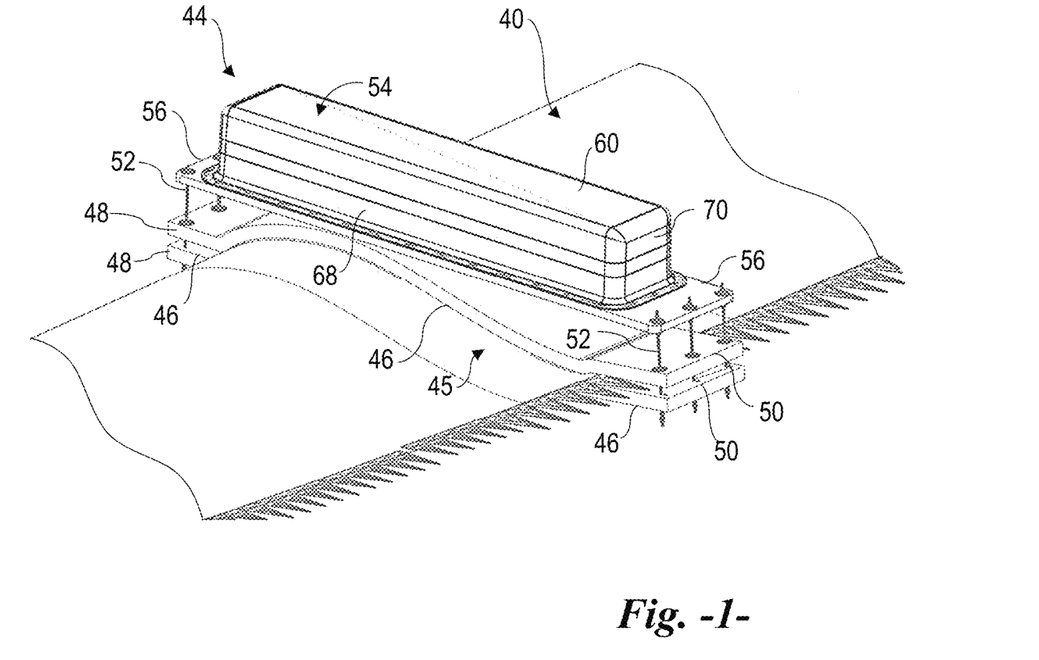
FIG. 1 is a perspective view of an embodiment of a tunable mass damper according to aspects of the invention mounted onto a structure.

FIG. 1 is a perspective view of a mass damper 44 on a structure 40, which may be, for example, a rotor blade of a wind turbine generator. An attaching system 45 is provided to mount or fix the mass damper 44 on the structure 40. In the illustrated example, the attaching system 45 includes opposite clamping shells 46 that conform to opposite side surfaces of the structure 40 and include end flanges 48, 50. The mass damper 44 includes a base 56 that extends above one of the clamping shells 46 between the flanges 48, 50. The base 56 is bolted to the flanges with bolts 52, wherein the bolts 52 also serve to bolt the opposite flanges 48 together as well as the opposite flanges 50.

The mass damper 44 includes a housing 54 mounted onto the base 56, wherein the working components of the mass damper 44 are contained within the housing 54, as described in greater detail below. The housing 56 includes side walls 68, end walls 70, and a top 60. It should be appreciated that the housing 56 may have any geometric shape.

It should be appreciated that the mass damper 44 may be mounted to the structure using any suitable attaching system, including mechanical fasteners, adhesives, and so forth.

Figure 2:
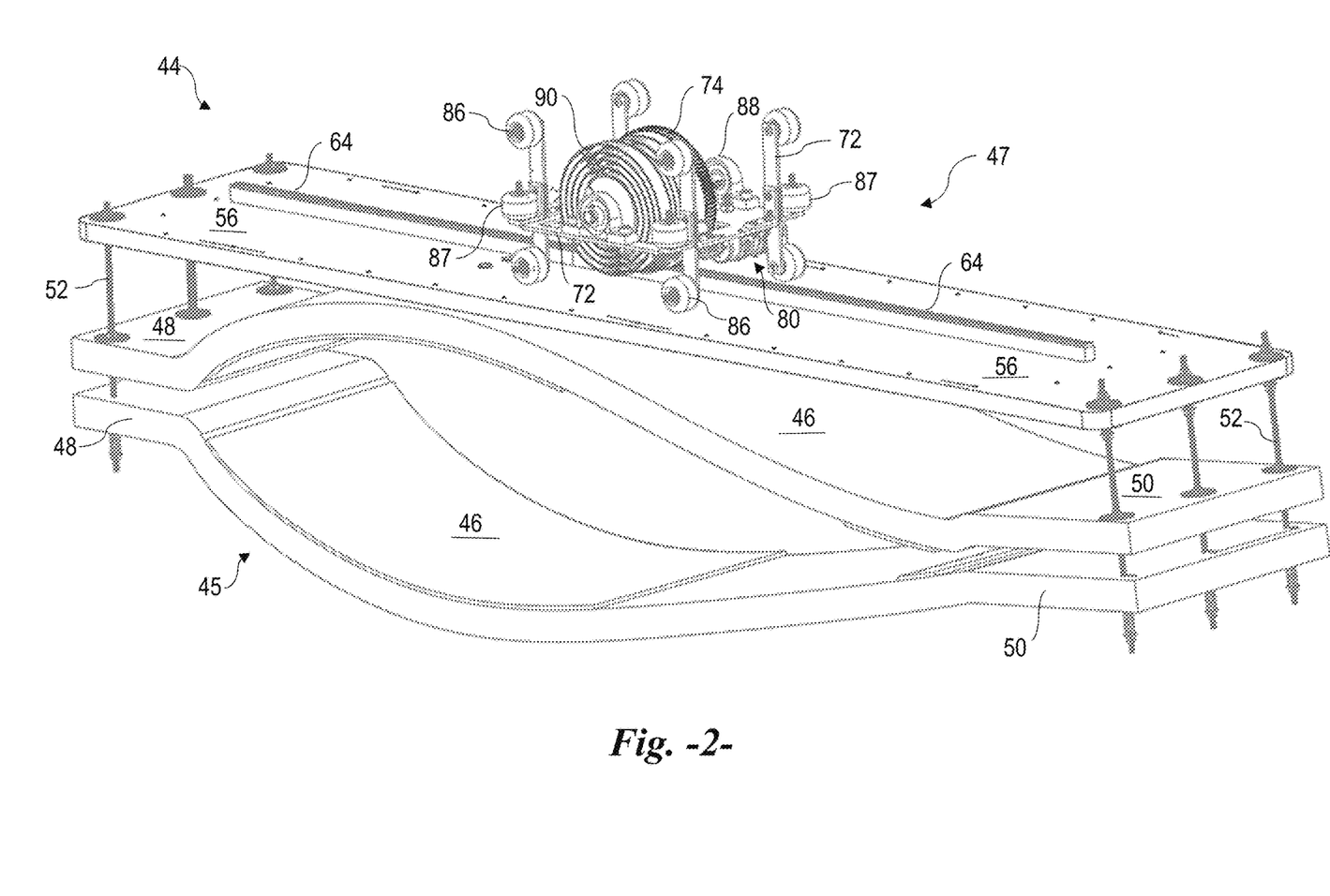
FIG. 2 is a more detailed perspective view of the tunable mass damper of FIG. 1.
Figure 3A:
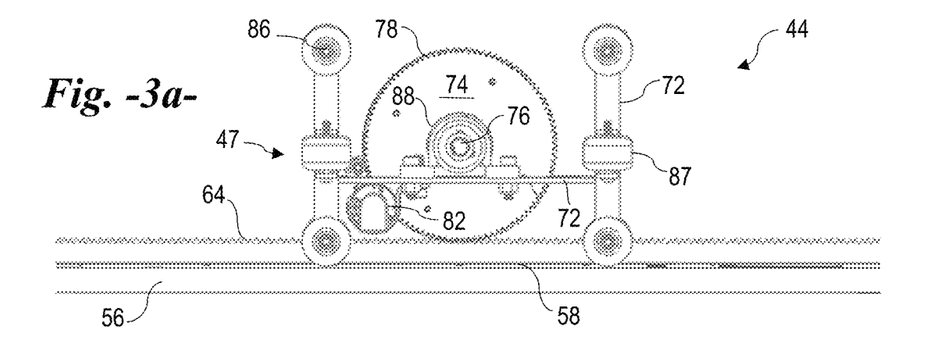
FIG. 3a is a side view of the mass damper of FIG. 2.
Figure 3B:
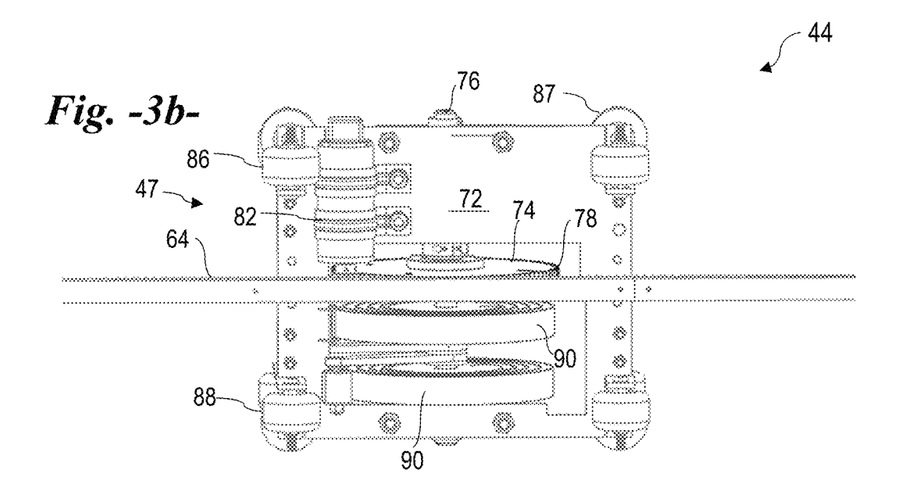
FIG. 3b is a bottom view of the mass damper of FIG. 2.
Figure 3C:
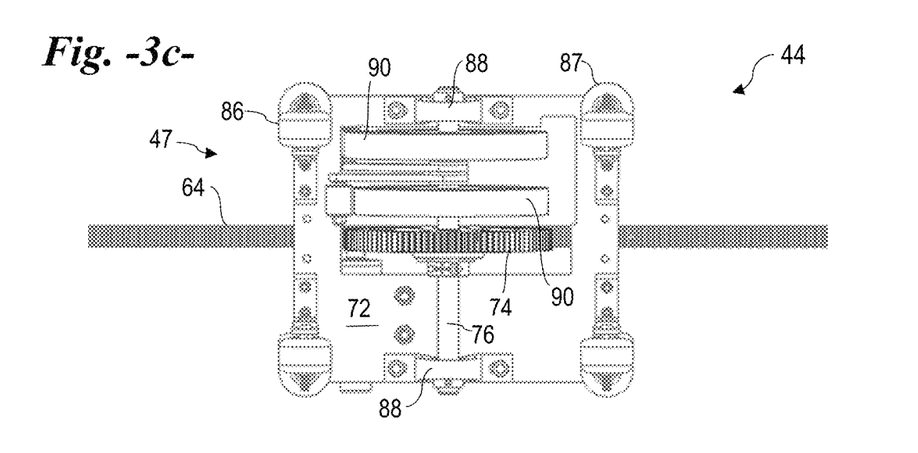
FIG. 3c is a top view of the mass damper of FIG. 2.

Referring to the perspective view of FIG. 2 and the various views of FIGS. 3a-3c and 4, an embodiment of a mass damper 44 in accordance with aspects of the invention is provided. When mounted on a wind turbine rotor blade, the mass damper 44 is intended to reduce vibrations and loads in rotor blades during a non-operational mode of the wind turbine wherein the rotor hub in a locked (i.e., standstill) or idling condition. The mass damper 44 is mounted to at least one, and preferably all, of the rotor blades before or shortly after placing the wind turbine in the non-operational mode. The mass damper 44 is tunable to an excitation frequency of the respective rotor blade as operating conditions experienced by the wind turbine change during the locked or idling condition, as explained in greater detail below.

The mass damper 44 includes a mass component 47 that moves along a stroke path within the mass damper 44. The term "mass component" is used herein to collectively refer to a mass of the totality of the components on a frame 72 (and is inclusive of the frame 72) that move along a track 64 within the mass damper 44, as described in more detail below.

The illustrated embodiment of the mass damper 44 includes a flywheel 74 that is in geared engagement with a rotation damper 80. The mass damper 44 is tuned by controlling and changing a counter-torque exerted against rotation of the flywheel 74 by the rotation damper 80. This tuning function can be accomplished remotely via electronic controls at any time the mass damper 44 is mounted to a structure or machine. Thus, as operating conditions experienced by the structure or machine change, the mass damper 44 can be effectively tuned to the new conditions without removing the mass damper 44 from the structure or otherwise disassembling the mass damper 44.

The flywheel 74 is rotationally configured on a frame 72 that moves linearly along a chord-wise stroke length within the housing 54 relative to the rotor blade 22. The flywheel 74 is coupled to a shaft 76 that is supported for rotation by bearings 88. The flywheel 74 is in geared engagement with a first track gear 64 that may be mounted to the base 56, as particularly seen in FIG. 2. The track gear 64 extends longitudinally along the base 56 and effectively defines the stroke length of mass damper 44. The flywheel 74 has a geared outer circumferential surface 78 that meshes with the track gear 64. Thus, vibrations or oscillations induced in the structure on which the mass damper is mounted cause the flywheel 74 to rotate along the track gear 64. The mass damper 44 is tuned by increasing or decreasing a counter-torque applied to the flywheel 74, as described below.

Although not illustrated in the figures, the flywheel 74 may also be in geared engagement with a second track gear mounted to an underside of the top 60 of the housing 54.

In the depicted embodiment, the flywheel 74 is geared directly to the track gear 64 (which may include an additional upper track gear). It should be appreciated that an intermediate gear may be used between the flywheel 74 and the track gear 64.

Figure 4:
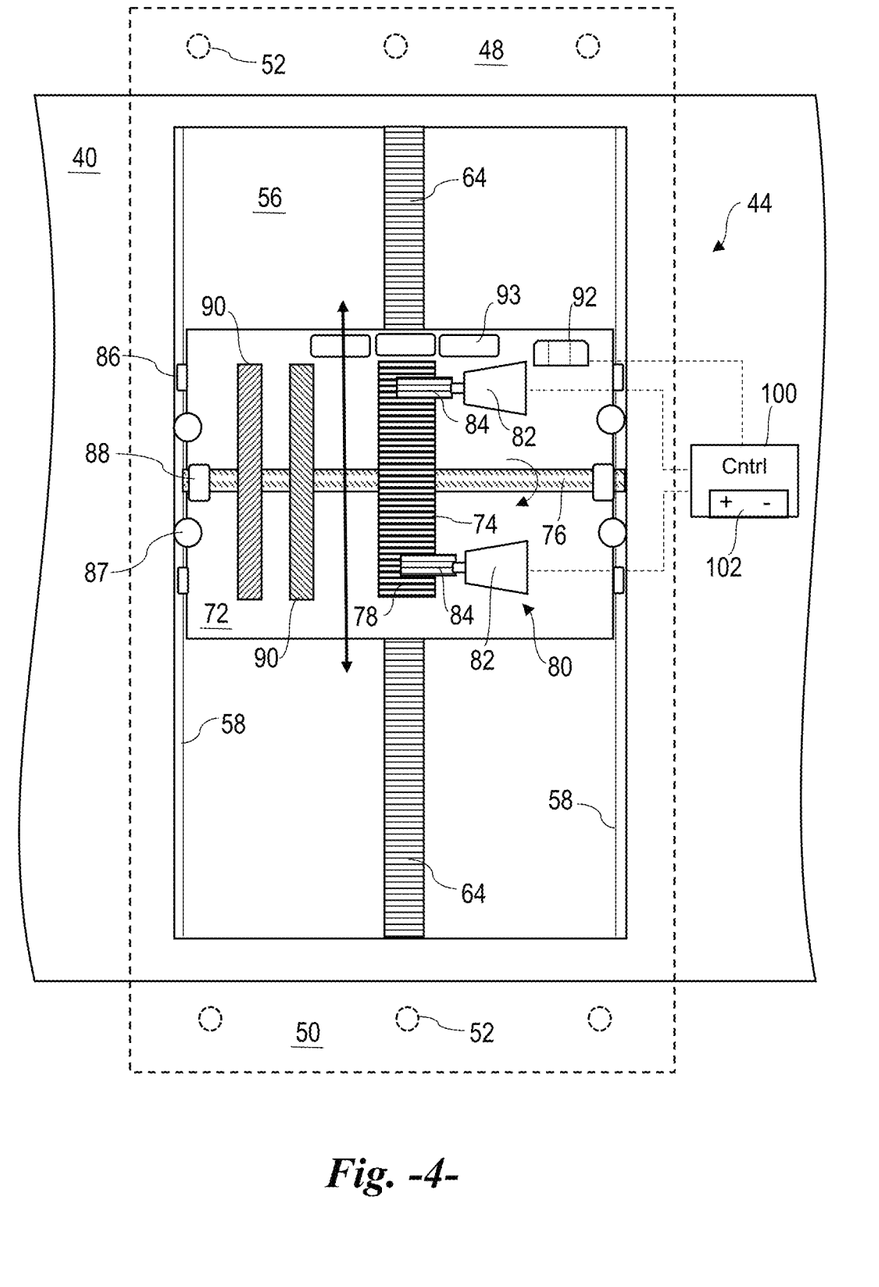
FIG. 4 is a top diagram view of an alternative embodiment of a tunable mass damper.

In addition to the weight of the components on (and including) the frame 72, the mass component 47 may also include additional ballast weights 93 that can be added to or removed from the frame 72, as depicted in the embodiment of FIG. 4.

The frame 72 (with components fixed thereto) is movable along the track gears 64, 66 within the housing 54. For this, the frame 72 may include a number of rollers 86 fixed thereto that ride along bottom runners 58 mounted on (or formed integral with) the base 56 and top runners 62 supported by or formed on the top 60 of the housing 56. Side rollers 87 may be mounted on the frame 72 to roll along the side walls 68 of the housing 56.

Oppositely-acting torsion springs 90 are provided to oppose the back-and-forth motion of the frame 72 (and attached components) relative to the track gears 64, 66, which also results in dampening of the blade vibrations and oscillations. One end of each spring 90 is fixed to the frame 72 and the other end of the spring 90 is fixed to the shaft 76. Thus, as the shaft 76 rotates in either direction, it "tightens" one of the torsion springs 90 to generate an opposing force against rotations of the shaft 76 (and thus rotation of the flywheel 74 fixed to the shaft 76).

The rotation damper 80 is mounted on the frame 72 and is in geared engagement (direct or indirect) with the flywheel. For example, the rotation damper may be in direct geared engagement with the outer circumferential surface 78 of the flywheel 74. The rotation damper 80 is "rotational" in that it is rotationally driven and produces a counter-torque that opposes rotation of the flywheel 74, this counter-torque being proportional to rotational velocity of the flywheel 74.

In a particular embodiment depicted in the figures, the rotation damper 80 includes at least one electrical generator 82 in geared engagement with (direct or indirect) and driven by the flywheel 74. In the depicted embodiment, the generator 82 is driven by a gear 84 that is also in engagement with the outer circumferential surface 78 of the flywheel 74. Thus, the generator 82 produces an electrical output (i.e., a current) that is directly proportional to the rotational velocity of the flywheel 74. The electrical output produces the counter-torque and, thus, the counter-torque is directly proportional to the rotational velocity of the flywheel 74.

It is a characteristic of electric generators that current from the generator produces a reaction torque (counter-torque) that, at a given load on the generator, is proportional to the magnitude of the current. Torque control of the generator works by changing the electrical load felt by the generator. This principle is utilized in the present invention to provide a remote electrical tuning capability to the mass damper 44.

Thus, by changing the effective resistive load on the generator 82 felt across the generator terminals, current (and thus counter-torque) produced by the generator 82 at a given rotational velocity of the flywheel 74 can be varied. A lower effective resistance leads to more current and more counter-torque, thus more damping capability of the mass damper 44. Controlling the effective resistance of the generator load effectively and automatically tunes the damping of the mass damper 44. Embodiments for varying the effective resistive load on the generator are discussed below with reference to FIG. 5.

In the embodiment of the mass damper 44 depicted in FIGS. 2 and 3a-3c, a single generator 82 is utilized to provide the tunable damping capability. It should be appreciated that that a plurality of generators 82 may be utilized to achieve a desired tuning capability within the constraints of available space on the frame 72. For example, in the embodiment depicted in FIG. 4, two generators 82 are engaged with the flywheel 74, with both generators 82 in communication with a common controller 100.

Referring to FIG. 4, the mass damper 44 (in particular, the mass component 47) has an effective stroke length in the chord-wise direction across the blade, wherein blade vibrations or oscillations of relatively lower amplitude result in a shorter stroke (shorter path of travel of the frame 72 on the track gear 64) and vibrations or oscillations of relatively greater amplitude result in a longer stroke of the mass component 47. Tuning the mass damper 44 to the stroke length is accomplished by changing the effective resistive load on the generator, as discussed above. Tuning of the device to limit the travel (i.e., stroke length) at higher vibration/oscillation amplitudes is an important safety feature so that travel of the mass component 47 does not exceed the available stroke path/length defined within the mass damper 44. On the other hand, it is desirable to tune the mass damper 44 to maximize its performance at lower amplitudes. Thus, the tuning scheme aims to increase stroke at lower amplitudes to maximize performance of the device, while limiting stroke at higher amplitudes to avoid damage to the mass damper 44. Thus, depending on the amplitude of the vibrations/oscillations induced in the rotor blade by the operating conditions experienced by the wind turbine, a desired stroke length is set or defined for the mass damper 44 to reduce the amplitude.

Figure 6:
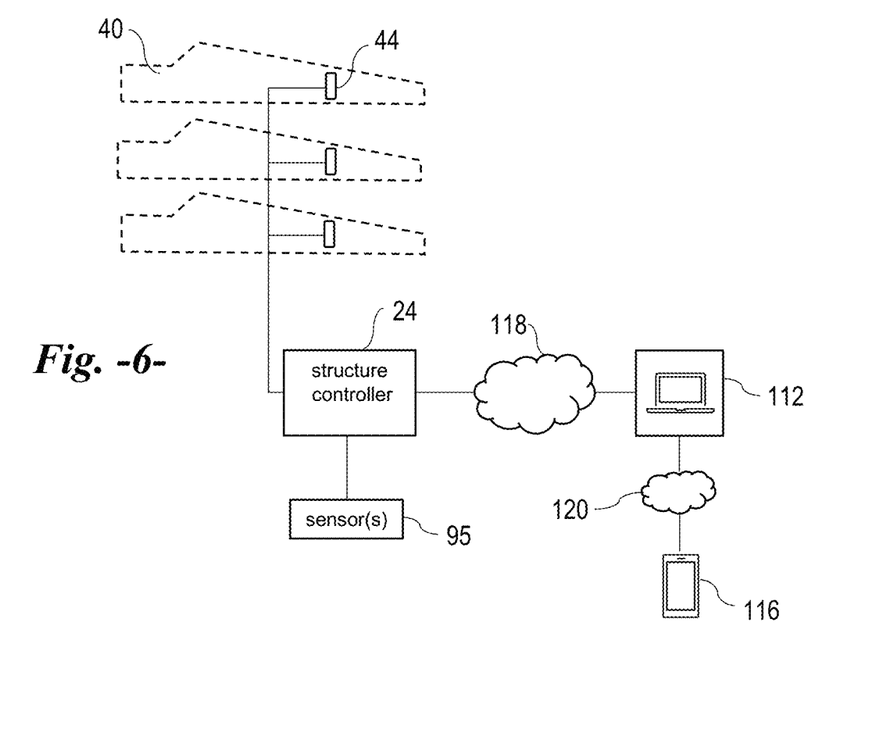
FIG. 6 is a control diagram for a structure utilizing multiple tunable mass dampers.

The mass damper 44 includes a dedicated onboard controller 100 to adjust or change the effective resistive load placed on the generator 82, thereby tuning the mass damper. Referring to FIG. 6, a sensor array 92 is provided on the frame 72 and is in communication with the controller 100. This array 92 may include one or more sensors. In a particular embodiment, three local sensors are configured in the array 92.

The first local sensor in the array 92 may be a position sensor configured to sense the instantaneous position of the mass component 47 along the track 64 to determine the current operating state of the mass damper 44. This is the main sensor used to provide feedback for the controller 100 to adjust the effective resistance on the generator. This first sensor may be, for example an incremental rotary encoder.

The second local sensor in the array 92 may be a neutral position sensor configured to provide a pulse (or other indication) at the neutral position of the mass component 47 corresponding to the middle of the stroke path. This sensor may be used as a check to ensure that the first sensor (e.g., encoder) is aligned correctly. If the encoder does not agree with the neutral position sensor, the encoder is reset to ensure a correct neutral position. This second sensor may be, for example, an inductive or hall effect sensor on the moving frame 72, and a magnet on the base 56. When the sensor travels over the magnet, a pulse is generated.

The third local sensor in the array 92 may be a limit position sensor, such as an inductive/hall effect sensor. This sensor is located on the mass component 47 (e.g., on the frame 72) in a way that does not respond to the neutral position sensor. The magnets for this third sensor are placed at the limits of the stroke path/length. If a pulse is detected from this sensor, action is taken to maximize the generator torque to oppose the motion because the moving frame is in danger of exceeding its design stroke.

Figure 5:
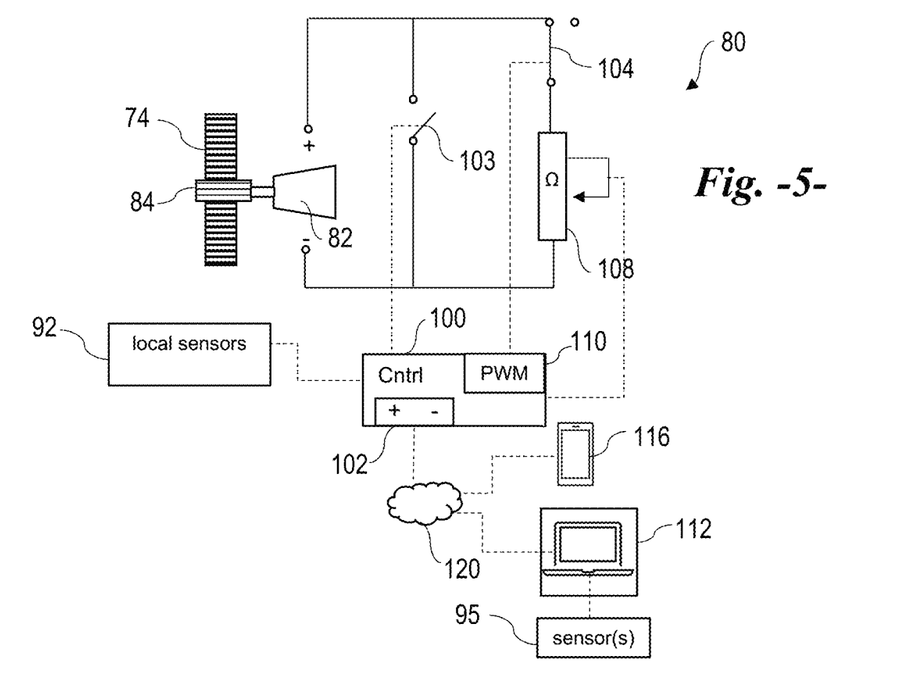
FIG. 5 is a control diagram for a tunable mass damper.

FIG. 5 is a simplified circuit diagram that depicts control aspects of the rotation damper 80, particularly the generator 82. The generator 82 is engaged with the flywheel 74 via the gear 84. An effective resistive load 108 is selectively placed across the generator 82 and controlled by the controller 100 (which may be a conventional PID controller).

In one embodiment, a circuit is established across the generator terminals. The circuit includes a resistive load 108 (which may be fixed/non-variable). A relay 104 is used to alternately place/remove this resistor 108 from the circuit. When the resistor 108 is placed across the generator terminals, the generator 82 produces an output current, which results in the counter-torque discussed above. This counter-torque is proportional to the generator output (current). A pulse width modulation (PWM) module 110 is used to alternately open and close the relay 104. The controller 100 adjusts the duty cycle of the PWM module 110 to control the amount of time the resistor 108 is placed in the circuit. Thus, an increased duty cycle (frequency) of the relay 104 results in an increase of the generator output and, thus, an increase in the counter-torque applied to the flywheel. Even though the resistor 108 may have a fixed resistance value, the effective resistance seen by the generator is varied by changing the duty cycle of the PWM module 110.

In an alternate embodiment, the resistive load 108 may be a variable load, such as a variable resistor indicated by the arrow in FIG. 5 or a resistor branch circuit wherein multiple resistors are variably combined to change the effective resistive value placed on the generator 82. The PID controller 100 may directly control the rheostat or resistor branch circuit to change the effective resistive load 108 placed on the generator 82 by altering the actual resistive value of the load 108.

The controller 100 receives position data via the sensor array 92 and controls the effective resistive load 108 (by controlling the variable resistor or the duty cycle of the PWM) in an open or closed feedback loop to control the counter-torque produced by the generator 82 as a function of stroke length of the mass component 47.

The circuit across the generator 82 may include a bypass relay 103 controlled by the controller 100 for relatively infrequent low voltage operation.

Still referring to FIG. 5, as mentioned, the controller 100 may be an individual dedicated controller configured within the housing 54 for each individual mass damper 44. The controller 100 may have a dedicated power supply, such as a rechargeable battery 102, or in an alternate embodiment may be supplied with power from a source in the wind turbine.

The controller 100 may be in communication with a remotely located central controller 112 (directly or via the wind turbine controller 24) for receipt or exchange of control commands or data therewith. For example, the central controller 112 may generate control commands to change certain operating parameters of the mass damper 44, such as the stroke length, response characteristics of the mass damper, power modes, duty cycle of the PWM, etc. The controller 100 may be in communication with a mobile hand-held controller 116 (e.g., a mobile smart device) directly or via an intermediary controller. The mobile controller 116 may run an application that allows an operator to monitor operation of the mass damper 44 and/or control the operating parameters thereof. In the depicted embodiment, the mobile controller 116 and the central controller 112 may be in direct communication with the mass damper controller 100 via a wireless network 120. The mass damper 44 would, in this case, also include wireless transmission and reception capability.

FIG. 6 depicts a control scheme wherein multiple structures 40 (e.g., multiple rotor blades of a wind turbine) each include one of the mass dampers 44 mounted thereon. Each damper 44 may have its own dedicated controller 100 in communication with a machine or structure controller 24 via a wireless network 121 or a wired connection. The wind turbine controller 24 may, in turn, be in communication with the central controller 112 via a wireless network 118. The mobile smart device 116 may be in direct communication with the wind turbine controller 24 or via the central controller 112 (and wireless network 120).

It should be appreciated that various control schemes and architecture may be utilized to provide the automatic tuning capability for the mass dampers 44 on the structure (e.g., rotor blades) and remote adjustment or monitoring of the operating state or parameters of the mass dampers 44.

As mentioned above, one or more sensors 95 may be utilized to provide data indicative of vibrations or oscillations induced in the structure or machine. The oscillations or vibrations may be detected or measured directly by displacement sensors 95 (e.g., accelerometers or strain gauges) located directly on the structure or machine. A vibration may be determined when the strain or deformation parameter satisfies a strain or deformation threshold, which may be determined by the controller 100 (or any of the other controllers 112, 116).

Determining a vibration of one or more blades may comprise processing an input signal which includes the strain parameter. The input signal may comprise a waveform of the strain parameter over time, which may be received from a sensor interrogation unit or directly from the strain sensors 95.

An oscillating displacement or movement of the structure or machine over a predefined period of time may involve a frequency. Therefore, in order to process the input signal, the method may include filtering the input signal and analyzing frequencies of the input signal which satisfy a frequency threshold. This way, only frequencies in a predefined critical range may be analyzed. Alternatively, the input signal may be processed analyzing all the spectrum of frequencies of the input signal. Through both alternatives, the mass dampers 44 may be tuned to counteract the vibration condition, as described herein.

The method may further comprise determining whether the structure or machine on which the mass damper 44 is mounted is in a resonance condition, which may be determined by any one of the controllers based on the frequency input signals satisfying a resonance threshold. The resonance threshold may involve frequencies higher than the frequency threshold. Alternatively, the resonance condition may be determined when the frequency of the input signal, and thus the energy of the vibration, increases for a defined time period.

Alternatively, the oscillations or vibrations induced in the structure or machine be predicted or inferred based on data from sensors disposed on or near the structure or machine.

Further aspects of the invention are provided by the subject matter of the following clauses:

Clause 1. A mass damper for reducing vibrations in a structure or machine, comprising: a frame; a base, the frame movable linearly along the base; a track gear disposed on the base; a flywheel in geared engagement with the track gear so as to be rotationally driven as the frame moves linearly relative to the base; a rotation damper mounted on the frame, the rotation damper in geared engagement with the flywheel, the rotation damper producing a counter-torque against rotation of the flywheel, the counter-torque being proportional to a rotational velocity of the flywheel; and the rotation damper comprising an electrical characteristic that is automatically changeable to adjust the counter-torque and tune the vibration mass damper.

Clause 2. The mass damper according to clause 1, wherein the rotation damper comprises an electrical generator driven by the flywheel, wherein the electrical characteristic is an electrical output of the generator that is directly proportional to the rotational velocity of the flywheel and produces the counter-torque.

Clause 3. The mass damper according to any one of clauses 1-2, comprising an effective electrical load placed on the generator, wherein the electrical output of the generator is varied by automatically adjusting the effective electrical load responsive to movement of the mass damper to tune the vibration mass damper.

Clause 4. The mass damper according to any one of clauses 1-3, wherein the effective electrical load comprises an electronically variable resistor configuration.

Clause 5. The mass damper according to any one of clauses 1-4, wherein the effective electrical load comprises a pulse width modulation (PWM) controlled relay, wherein, when actuated, the relay places a resistive load on the generator.

Clause 6. The mass damper according to any one of clauses 1-5, further comprising a local controller configured with the mass damper to adjust the effective electrical load responsive to the movement of the mass damper.

Clause 7. The mass damper according to any one of clauses 1-6, wherein the local controller is in communication with a remote controller.

Clause 8. The mass damper according to any one of clauses 1-7, further comprising an adjustable ballast weight mounted to the frame.

Clause 9. The mass damper according to any one of clauses 1-8, wherein the frame and the track gear are located within a housing mounted to the base, the base and the housing configured for stationary mounting to the structure or machine.

Clause 10. The mass damper according to any one of clauses 1-9, wherein the flywheel comprises an outer circumferential surface geared directly to the track gear.

Clause 11. The mass damper according to any one of clauses 1-10, wherein the rotation damper is geared directly to the outer circumferential surface of the flywheel.

Clause 12. The mass damper according to any one of clauses 1-11, wherein the rotation damper comprises an electrical generator driven by the flywheel.

Clause 13. The mass damper according to any one of clauses 1-12, further comprising an attachment system configured to removably attach the mass damper to the structure or machine, the attachment system comprising opposite clamping shells that conform to a shape of the structure or machine on which the mass damper is mounted, the base fixed to one of the clamping shells.

Clause 14. A method for reducing vibrations in a structure or machine, the method comprising: attaching an electronically tunable mass damper at a fixed location on the structure or machine; sensing vibrations or oscillations in the structure or machine; and tuning the mass damper based on the sensed vibrations or oscillations by automatically varying an electrical characteristic of the mass damper responsive to the sensed vibrations or oscillations.

Clause 15. The method according to clause 14, wherein the tuning process is controlled by a local controller configured with the mass damper.

Clause 16. The method according to any one of clauses 14-15, wherein the local controller is in communication with a remote controller.

Clause 17. The method according to any one of clauses 14-16, wherein the mass damper is in communication with a mobile smart device.

Clause 18. The method according to any one of clauses 14-17, wherein the mass damper includes a flywheel connected to a rotation damper, the step of remotely tuning the mass damper comprising electronically controlling a counter-torque exerted against rotation of the flywheel by the rotation damper.

Clause 19. The method according to any one of clauses 14-18, wherein the rotation damper includes an electrical generator in geared engagement with and driven by the flywheel, wherein an electrical output of the generator is directly proportional to the rotational velocity of the flywheel and produces the counter-torque.

Clause 20. The method according to any one of clauses 14-19, wherein the tuning step comprises automatically adjusting an effective electrical load placed on the generator to change the counter-torque exerted by the generator at a given rotational speed of the flywheel.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A mass damper for reducing vibrations in a structure or machine, comprising:
    a frame;
    a base configured to be stationarily mounted onto the structure or machine, the frame movable linearly along a surface of the base in a longitudinal direction of the base;
    a track gear disposed longitudinally on the surface of the base;
    a flywheel in geared engagement with the track gear so as to be rotationally driven as the frame moves linearly along the track in the longitudinal direction of the base;
    a rotation damper mounted on the frame, the rotation damper in geared engagement with the flywheel, the rotation damper producing a counter-torque against rotation of the flywheel, the counter-torque being proportional to a rotational velocity of the flywheel; and
    the rotation damper comprising an electrical characteristic that is automatically changeable to adjust the counter-torque and tune the vibration mass damper.

2. The mass damper according to claim 1, wherein the rotation damper comprises an electrical generator driven by the flywheel, wherein the electrical characteristic is an electrical output of the generator that is directly proportional to the rotational velocity of the flywheel and produces the counter-torque.

3. The mass damper according to claim 2, comprising an effective electrical load placed on the generator, wherein the electrical output of the generator is varied by automatically adjusting the effective electrical load responsive to movement of the mass damper to tune the vibration mass damper.

4. The mass damper according to claim 3, wherein the effective electrical load comprises an electronically variable resistor configuration.

5. The mass damper according to claim 3, wherein the effective electrical load comprises a pulse width modulation (PWM) controlled relay, wherein, when actuated, the relay places a resistive load on the generator.

6. The mass damper according to claim 3, further comprising a local controller configured with the mass damper to adjust the effective electrical load responsive to the movement of the mass damper.

7. The mass damper according to claim 6, wherein the local controller is in communication with a remote controller.

8. The mass damper according to claim 1, further comprising an adjustable ballast weight mounted to the frame.

9. A mass damper for reducing vibrations in a structure or machine, comprising:
    a frame;
    a base, the frame movable linearly along the base;
    a track gear disposed on the base;
    a flywheel in geared engagement with the track gear so as to be rotationally driven as the frame moves linearly relative to the base;
    a rotation damper mounted on the frame, the rotation damper in geared engagement with the flywheel, the rotation damper producing a counter-torque against rotation of the flywheel, the counter-torque being proportional to a rotational velocity of the flywheel;
    the rotation damper comprising an electrical characteristic that is automatically changeable to adjust the counter-torque and tune the vibration mass damper; and wherein the frame and the track gear are located within a housing mounted to the base, the base and the housing configured for stationary mounting to the structure or machine.

10. The mass damper according to claim 1, wherein the flywheel comprises an outer circumferential surface geared directly to the track gear, the rotation damper geared directly to the outer circumferential surface of the flywheel.

11. A mass damper for reducing vibrations in a structure or machine, comprising:
   a frame;
   a base, the frame movable linearly along the base;
   a track gear disposed on the base;
   a flywheel in geared engagement with the track gear so as to be rotationally driven as the frame moves linearly relative to the base;
   a rotation damper mounted on the frame, the rotation damper in geared engagement with the flywheel, the rotation damper producing a counter-torque against rotation of the flywheel, the counter-torque being proportional to a rotational velocity of the flywheel;
   the rotation damper comprising an electrical characteristic that is automatically changeable to adjust the counter-torque and tune the vibration mass damper;
   the flywheel comprising an outer circumferential surface geared directly to the track gear; and
   wherein the rotation damper is geared directly to the outer circumferential surface of the flywheel.

12. The mass damper according to claim 11, wherein the rotation damper comprises an electrical generator driven by the flywheel.

13. The mass damper according to claim 1, further comprising an attachment system configured to removably attach the mass damper to the structure or machine, the attachment system comprising opposite clamping shells that conform to a shape of the structure or machine on which the mass damper is mounted, the base fixed to one of the clamping shells.

14. A method for reducing vibrations in a structure or machine, the method comprising:
   attaching the electronically tunable mass damper according to claim 1 at a fixed location on the structure or machine;
   sensing vibrations or oscillations in the structure or machine; and
   tuning the mass damper based on the sensed vibrations or oscillations by automatically varying an electrical characteristic of the mass damper responsive to the sensed vibrations or oscillations.

15. The method according to claim 14, wherein the tuning process is controlled by a local controller configured with the mass damper.

16. The method according to claim 15, wherein the local controller is in communication with a remote controller.

17. The method according to claim 14, wherein the mass damper is in communication with a mobile smart device.

18. The method according to claim 14, wherein the step of remotely tuning the mass damper comprising electronically controlling a counter-torque exerted against rotation of the flywheel by the rotation damper.

19. The method according to claim 18, wherein the rotation damper includes an electrical generator in geared engagement with and driven by the flywheel, wherein an electrical output of the generator is directly proportional to the rotational velocity of the flywheel and produces the counter-torque.

20. The method according to claim 19, wherein the tuning step comprises automatically adjusting an effective electrical load placed on the generator to change the counter-torque exerted by the generator at a given rotational speed of the flywheel.

* * * * *